(12) United States Patent
Jacobson et al.

(10) Patent No.: US 8,072,093 B2
(45) Date of Patent: Dec. 6, 2011

(54) INTELLIGENT POWER SYSTEM

(75) Inventors: Boris S. Jacobson, Westford, MA (US); Jacqueline M. Bourgeois, Sudbury, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/888,533

(22) Filed: Sep. 23, 2010

(65) Prior Publication Data
US 2011/0018341 A1   Jan. 27, 2011

Related U.S. Application Data

(63) Continuation of application No. 10/692,580, filed on Oct. 24, 2003, now Pat. No. 7,825,536.

(60) Provisional application No. 60/423,640, filed on Nov. 4, 2002.

(51) Int. Cl.
*H02J 3/38* (2006.01)

(52) U.S. Cl. .......................................... 307/19; 700/291

(58) Field of Classification Search .................. 700/286, 700/291, 295, 297; 307/18, 19, 23, 38, 43, 307/64, 80, 85, 147
See application file for complete search history.

(56) References Cited

U.S. PATENT DOCUMENTS

| | | | |
|---|---|---|---|
| 2,135,250 A | 11/1938 | Cole | |
| 3,515,893 A | 6/1970 | Park | |
| 3,911,415 A | 10/1975 | Whyte | |
| 4,467,220 A * | 8/1984 | Page | ............................. 307/19 |
| 5,422,561 A | 6/1995 | Williams et al. | |
| 5,764,099 A | 6/1998 | Hewitt | |
| 5,892,299 A | 4/1999 | Siewert et al. | |
| 5,895,982 A | 4/1999 | Eng | |
| 6,236,949 B1 | 5/2001 | Hart | |

(Continued)

FOREIGN PATENT DOCUMENTS

EP   0951128   10/1999

(Continued)

OTHER PUBLICATIONS

Notification of Transmittal of the International Search Report or the Declaration, PCT/US03/33885, date of mailing Apr. 1, 2004, 4 pages.

(Continued)

*Primary Examiner* — Rexford Barnie
*Assistant Examiner* — Daniel Cavallari
(74) *Attorney, Agent, or Firm* — Daly, Crowley, Mofford & Durkee, LLP

(57) ABSTRACT

An intelligent power system includes one or more common power sources and one or more subsystem components interconnected with the common power sources. Each common power source includes an unregulated bus, a plurality of power source regulated buses, each regulated bus originating at a common power source and terminating at a respective one of k load subsystems, a power source, first, second, third and fourth groups of switches, a regulator having a plurality of outputs and an energy storage element. The regulator is configured to provide a time-shared mode of operation to provide power sequentially to one or more of the k load subsystems, such that the time intervals when the regulator is connected to any one of the k load subsystems do not overlap, and where the regulator is configured to switch in supplemental power from the energy storage, if necessary, to ensure that an average power delivered by the regulator does not exceed the average power consumed by all of the k load subsystems.

20 Claims, 13 Drawing Sheets

U.S. PATENT DOCUMENTS

| | | | |
|---|---|---|---|
| 6,424,552 B1 | 7/2002 | Jacobson | |
| 6,856,283 B2 | 2/2005 | Jacobson et al. | |
| 7,825,536 B2 | 11/2010 | Jacobson et al. | |

FOREIGN PATENT DOCUMENTS

| | | | |
|---|---|---|---|
| GB | 1 485 823 | 9/1977 | |

OTHER PUBLICATIONS

Office Action dated Aug. 2, 2006 (2 pages) and Response to Office Action dated Apr. 24, 2008 from Australian Patent Application No. 2003280008, 17 pages.

Notice of Acceptance dated May 15, 2008 from Australian Patent Application No. 2003280008, 3 pages.

Office Action dated Nov. 2, 2009 for EP Patent Application No. 03 773 314.4, 5 pages.

Response to Nov. 2, 2009 Office Action for EP Patent Application No. 03 773 314.4, dated May 10, 2010, 22 pages.

U.S. Appl. No. 10/692,580, filed Oct. 24, 2003, file through Apr. 5, 2011, 568 pages.

European Office Action dated Aug. 4, 2011 for European Patent Application No. 03773314.4, from which present application claim priority, 4 pages.

* cited by examiner

INTELLIGENT POWER SYSTEM

CROSS REFERENCE TO RELATED APPLICATIONS

This application is a continuation of nonprovisional patent application Ser. No. 10/692,580, filed Oct. 24, 2003, which is a nonprovisional application of provisional patent application 60/423,640, filed Nov. 4, 2002, which is hereby incorporated by reference in its entirety.

STATEMENT REGARDING FEDERALLY SPONSORED RESEARCH

Not Applicable.

FIELD OF THE INVENTION

The present invention relates generally to power systems and more particularly to a system which can detect and isolate failed segments and reconfigure the system to restore power.

BACKGROUND OF THE INVENTION

Conventional power distribution systems typically include multiple power sources and storage elements and are known by those of reasonable skill in the art. Despite the relative simplicity and wide acceptance of this conventional power distribution architecture, the conventional architecture suffers from several disadvantages. With few exceptions, unregulated energy sources are incompatible with parallel connection to a common bus. One problem of the conventional approach is that the architecture requires power regulators to interface incompatible sources to the bus. If such unregulated sources such as batteries are connected to the common bus, the unregulated source with the highest voltage will back-feed other sources thereby generating circulating currents. The magnitude of these currents depends on the voltage difference between the various sources and the total resistance of the current path. Because the source and bus resistances are low, the circulating currents will degrade system efficiency and may even damage components and wiring.

Another problem associated with this power system architecture is its susceptibility to single point failures. If the common bus, the load, or the output of a single voltage regulator is shorted, the whole system can be disabled. Still another problem associated with conventional power system architectures is the systems inability to control the power flow. Because there is only one bus that connects all loads and all power sources, this architecture does not allow delivering power to a section of the load from selected sources. The conventional architecture lacks flexibility, i.e., failed elements or bus segments cannot be isolated and disconnected from the system.

SUMMARY OF THE INVENTION

An intelligent power system is presented. The system includes one or more common power sources and one or more subsystem components interconnected with the common power sources. Each common power source includes a regulated bus, an unregulated bus, a sensor, a controller and a plurality of switches operated by the controller. A subsystem component includes a regulated bus, an unregulated bus, a power source, a sensor, a controller and a plurality of switches operated by the controller. With such a configuration, the system is able detect and isolate failed segments of the power system and is reconfigurable to restore power.

BRIEF DESCRIPTION OF THE DRAWINGS

The invention will be more fully understood from the following detailed description taken in conjunction with the accompanying drawings, in which.

DETAILED DESCRIPTION OF THE INVENTION

The present invention comprises a new power system architecture that resolves the problems associated with conventional power systems and further provides important advantages not available with conventional power system architectures. Autonomous power systems have to satisfy conflicting requirements such as high density, low weight and volume, energy storage, continuous and reliable operation with partial damage, fault isolation and self-generating and restoring capabilities.

Figure 1:
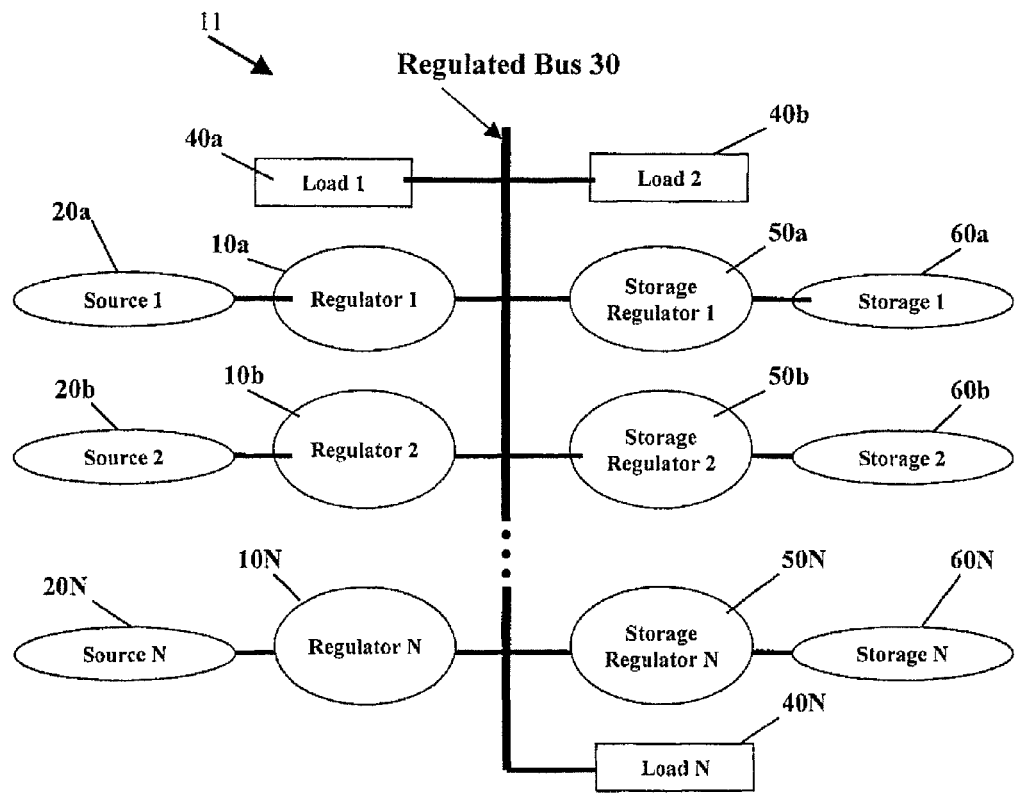
FIG. 1 is a block diagram of a conventional power system.

Referring now to FIG. 1, a prior art power system architecture 1 is shown. This architecture 1 uses individual voltage regulators 10a-10N to couple multiple power sources 20a-20N to a common regulated bus 30. The regulated bus 30 is used to provide power to one or more loads 40a-40N. The regulators can be realized as voltage source regulators 10a-10N to couple voltage sources 20a-20N to the regulated bus 30, and also as storage regulators 50a-50N to couple storage sources 60a-60N to the regulated bus 30.

Figure 2:
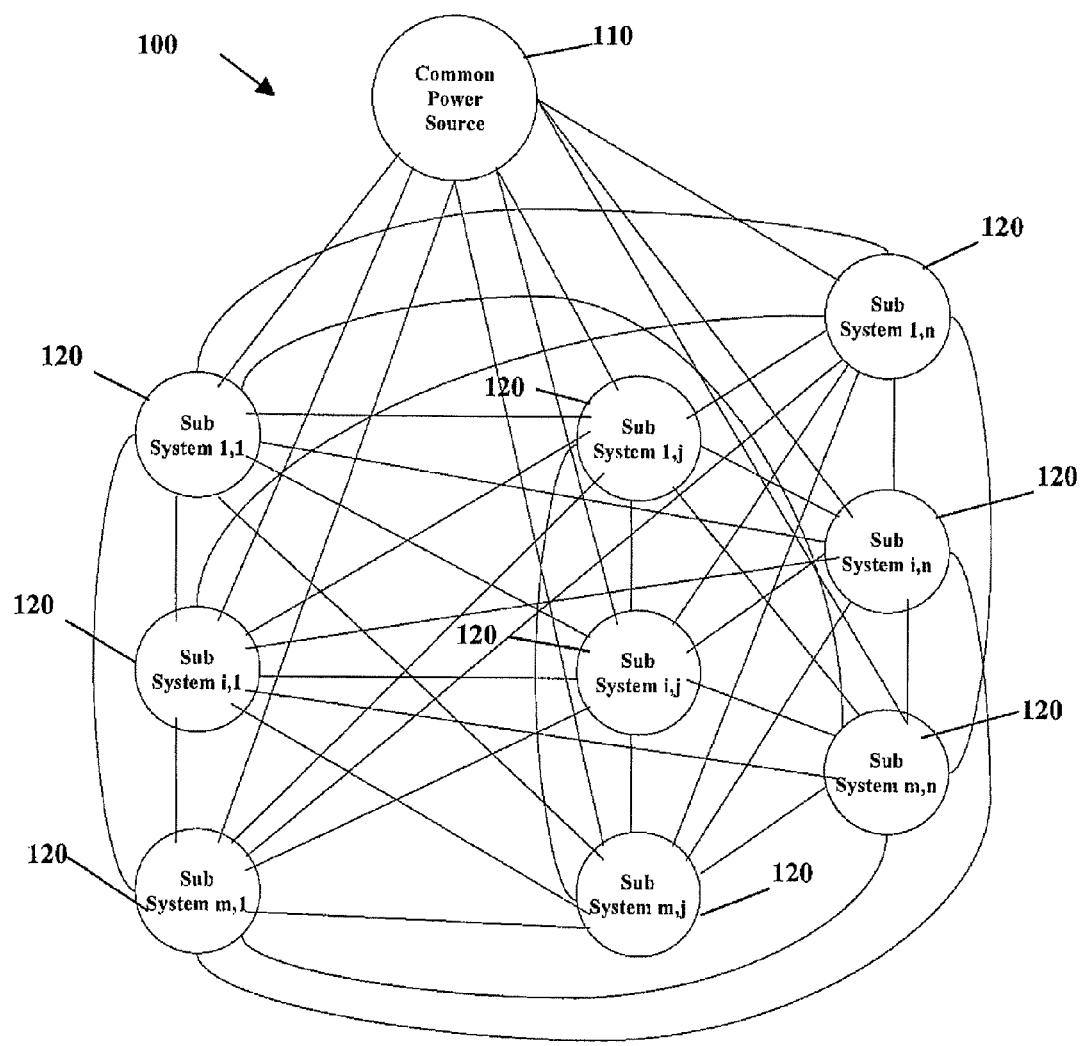
FIG. 2 is a block diagram of the power architecture of the present invention.

Referring now to FIG. 2, a high-level block diagram of the presently disclosed power system 100 is presented. This architecture comprises a common power source and m*n=k interconnected subsystems 120. The number of connections between subsystems 120 and the common power source 110 may vary from zero (a self-sufficient system) to m*n (a source-dependent system). Each line between a subsystem 120 and the common power source 110 represents multiple power and signal connections. The number of interconnections between subsystems may vary from zero (a completely independent system) to k*(k−1)/2 (a fully connected system). Each line between subsystems 120 in FIG. 2 represents multiple power and signal connections between the subsystems 120. Another version of this architecture includes multiple subsystems wired together and connected to the common power source as groups.

Figure 3:
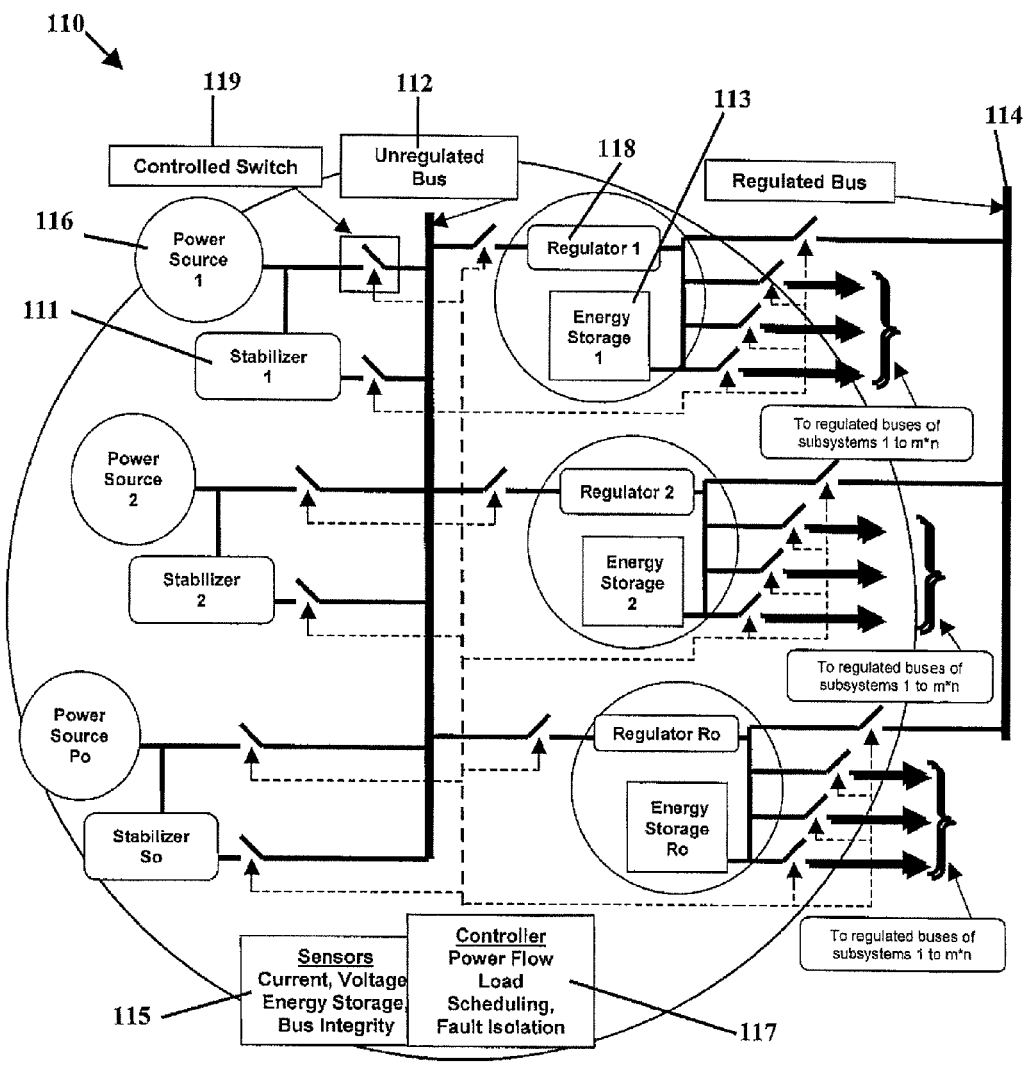
FIG. 3 is a block diagram of a common source element of the present invention.

A block diagram of the common power source 110 is shown in FIG. 3. The common power source 110 includes an unregulated voltage bus 112, a regulated voltage bus 114, Po power sources 116, Ro regulators 118, So bus stabilizers 111, Eo energy storage units 113, sensors 115 and a controller 117, where Po, Ro, So and Eo are each respectively an integer equal to or greater than one. A power source 116 may be realized as a battery, a generator, a fuel cell, a solar cell or the like. A stabilizer 111 is similar to a regulator in that a stabilizer is a power conversion device wherein one voltage level is converted to another voltage level. An energy storage device 113 may be realized as a battery, flywheel, capacitor, inductor or similar type device. All elements of the common power source except the controller 117 and sensors 115 are connected to one or both buses through controlled switches 119. The switches 119 may be electronic solid state, vacuum tube, or electro-mechanical devices. The output of each regulator 118 is connected to regulated buses of all subsystems as well as the regulated bus 114 of the common source. As an alternative, the common regulated bus 114 may be connected to one or more regulated buses of individual subsystems. The subsystem-to-subsystem control signals interconnect may be the same interconnect (electrical (wire-based), optical, infrared, RF, etc.) used for interconnecting a subsystem controller to a power source controller, although other embodiments may use a different interconnect for the subsystem-to-subsystem control signals interconnect than the subsystem-to-power source control signals interconnect.

Figure 4:
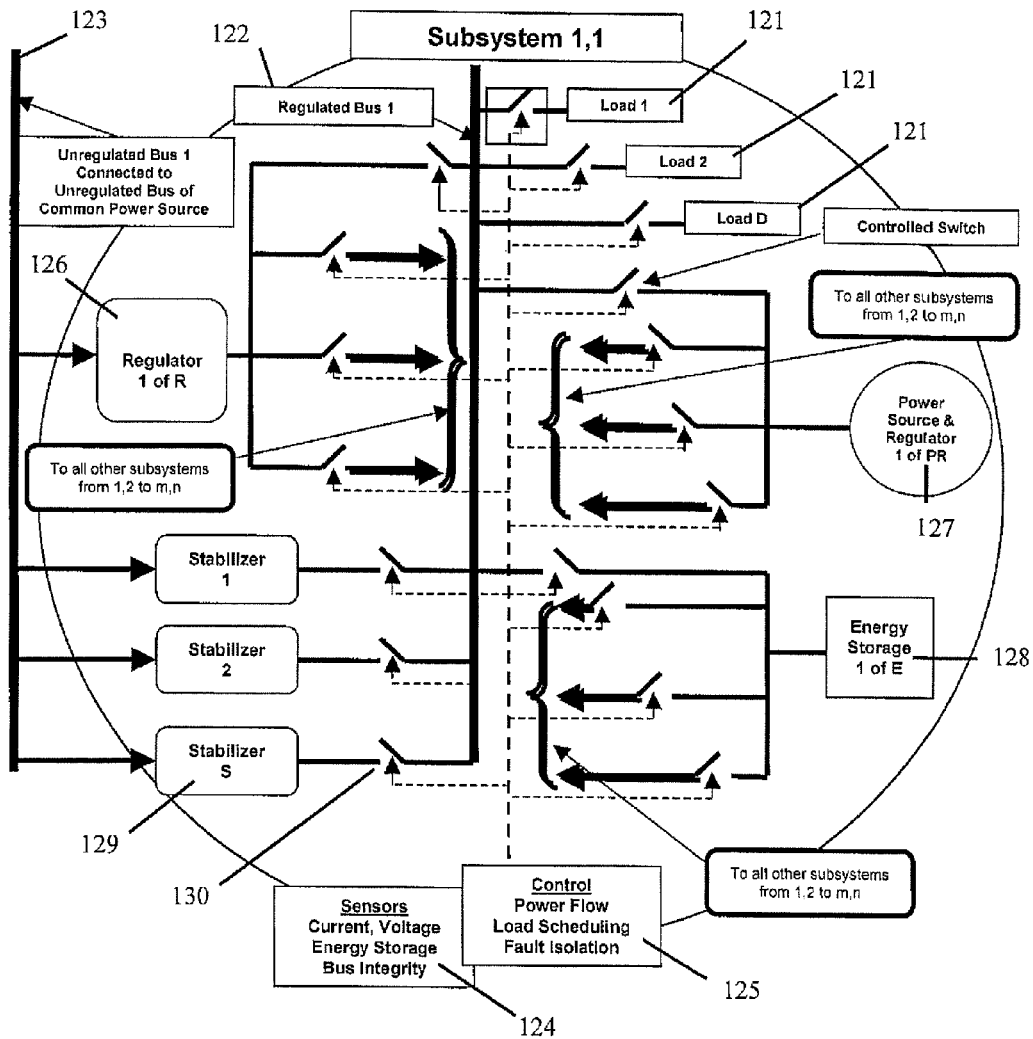
FIG. 4 is a block diagram of a subsystem element of the present invention.

Referring now to FIG. 4 a block diagram of a subsystem 120 (subsystem 1,1 of FIG. 2 in this example) is shown. The subsystem includes a regulated voltage bus 122, an unregulated voltage bus 123, PR regulated power sources 127 (only one shown in FIG. 4), R regulators 126 (only one shown in FIG. 4), S bus stabilizers 129, E energy storage units 128 (only one shown in FIG. 4), D loads 121, sensors 124 and a subsystem controller 125, where P, R, S, E, and D are each respectively an integer equal to or greater than one. All subsystem elements except the controller 125 and sensors 124 are connected to one or both buses through controlled switches 130. Each regulated power source 127 is connected to regulated buses of all other subsystems as well as to the internal regulated bus 122.

The presently disclosed architecture provides several advantages not available from conventional power systems. A system comprising incompatible sources can operate without regulators. One way of achieving this is to activate only a single power source at any moment in time. Another method is to break connections between subsystems that contain power sources using controlled switches and operate all sources simultaneously (completely independent system). The presently disclosed architecture can also use switches to operate power sources in a sequential way or switching between the two modes described above. Thus, the new approach applies to systems that contain both regulated and unregulated buses.

Because the system comprises self-sufficient interconnected subsystems as well as the common power source, the presently disclosed power system is not susceptible to single point failures.

Each subsystem or element of the new system is connected to all other elements and to the common energy source and storage. Controllers can direct power flow from one subsystem to another subsystem, from the central source to any number of subsystems, and from any number of subsystems to storage elements. This control is accomplished by a controller opening and/or closing the appropriate switches to provide the desired configuration. Each controller is in communication with a respective sensor and further each controller is in communication with each other controller.

In the event of a failure, the controllers, by way of the sensors, will detect failed elements or bus segments. The controllers then isolate the failed element or bus segment and re-configure the distribution to restore power by activating and/or deactivating the appropriate switches. Constant monitoring of the power flow through bus segments allows the controller to determine their condition and identify failures. For any waveforms of voltage V(t) and current I(t), the instantaneous power at the output of the power source or at the load fed by a bus segment is expressed as follows:

$$P = 1/T \int V(t)I(t)dt \text{ for the integration time interval from 0 to } T$$

This expression can be simplified for specific waveforms. For example, in the case of sinusoidal voltage and current the power is:

$$P_{SINE} = V_{RMS} I_{RMS}$$

One way to identify failed elements or bus segments is to compare the power supplied by a source with the power consumed by a load and voltage at the source with voltage at the load. For example, if a system consists of one source and multiple loads the power balance for lossless distribution is expressed as follows:

$$P_{SOURCE} = \Sigma(P_{LOAD1} + P_{LOAD2} + \ldots + P_{LOADG}), \text{ summing from 1 to } G$$

Where $P_{SOURCE}$ is power at the source $P_{LOAD1}$ through $P_{LOADG}$ is power at the load Assuming that the loads are not regenerative, power at the source always equals to the total power consumed by the loads. If the bus segment feeding one load failed, the power balance equation would not hold. To eliminate the possibility that the load itself failed, the controller would measure the voltage at the load terminals. If the load voltage equals to the source voltage and the load does not draw its share of power, then the load has failed. If the load voltage does not equal to the source voltage (for lossless distribution) and the load does not draw its rated power, then the bus segment has failed.

Figure 5:
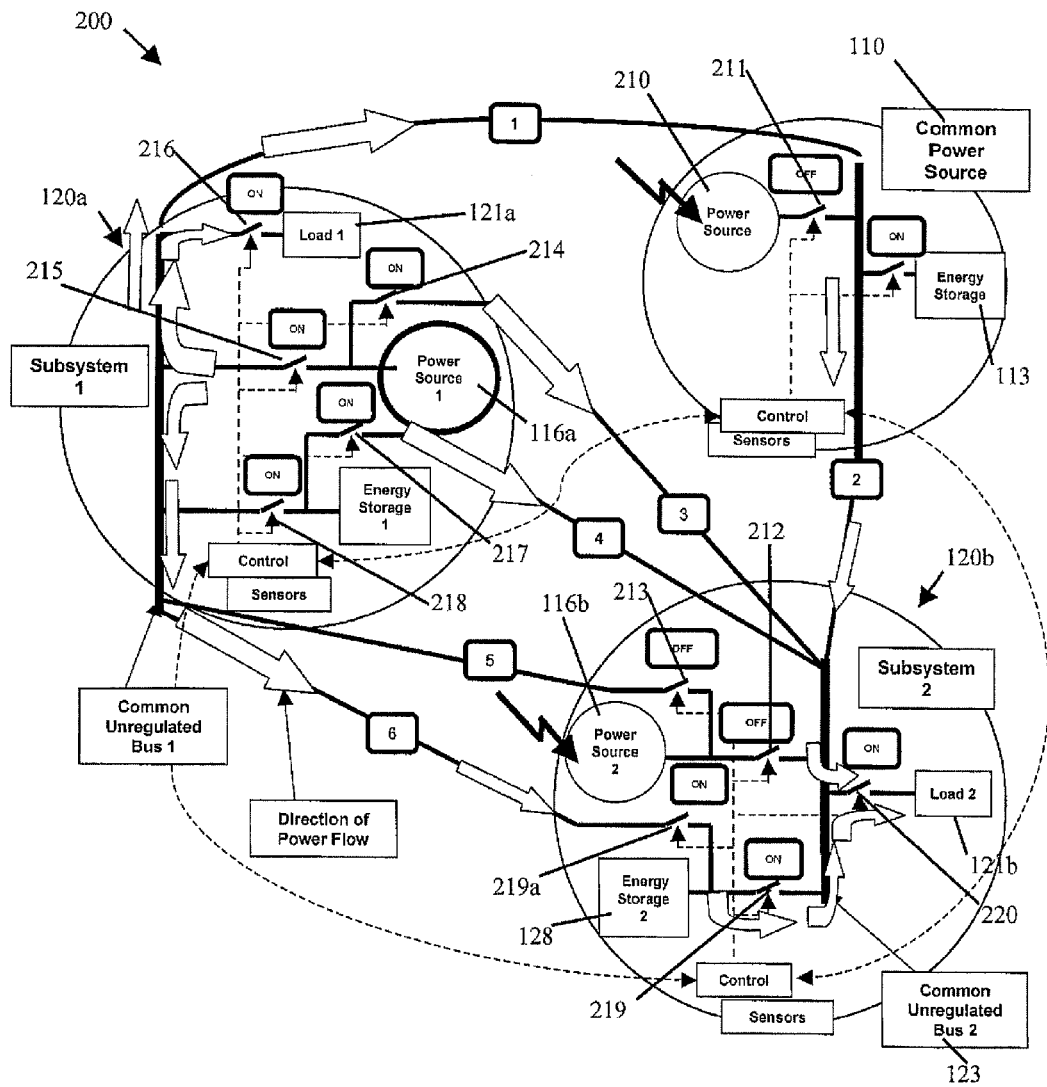
FIG. 5 is a block diagram of a single unregulated source embodiment of the present architecture.

Referring now to FIG. 5, an application involving an unregulated system 200 is shown. The system comprises two subsystems 120a and 120b, and a common power source 110. All power sources in this system are unregulated and are therefore incompatible with parallel operation. For the mode of operation shown in FIG. 5, the common power source 110 and source in the subsystem 2 are disconnected and both loads operate from the single power source located in the subsystem 1.

The reliability of the new architecture is based upon the power transfer between components through the interconnect. Because power flows through multiple conductors and the system contains multiple sources, the failure of any single element (or possibly multiple elements) does not disrupt operation of the power system.

Conductor 1 provides power from subsystem 120a to energy storage unit 113 of the common power source 110. Additionally, conductors 2 and 3 provide power from subsystem 120a to energy storage unit 113 of the common power source 110. Conductors 3 and 4 also provide power from subsystem 120a to subsystem 120b unregulated bus 123, load 121b and energy storage device 128. Conductors 1, 2 and 6 also provide power from subsystem 120a to subsystem 120b unregulated bus 123, load 121b and energy storage device 128.

The power source 210 is disconnected from the common bus of Common Power Source 110 by opening switch 211. Similarly, the power source 116b of subsystem 120b is also disconnected from the unregulated bus by opening switch 212 and is further disconnected from the unregulated bus of subsystem 120a by the opening of switch 213. In order to permit power source 116a of subsystem 120a to provide power to load 121 a of subsystem 120a and also to load 121b of subsystem 120b switches 214-218 of subsystem 120a are closed as are switches 219, 219a and 220 of subsystem 120b. Power from power source 116a flows from subsystem 120a to common power source 110 through conductor 1 of the system interconnect. Power from power source 116a also flows from subsystem 120a to subsystem 120b through conductor 3, 4 and 6 of the system interconnect. Power also flows from power source 116a through common power source 110 and to subsystem 120b through conductor 2 of the system interconnect. With such an arrangement power source 116a is able to provide power to load 121a and also to load 121b.

Other modes of operation supported by the present power system architecture include a self-sufficient mode of operation wherein both subsystems are disconnected from each other and the common source, a mode wherein operation is from the common power source, a mode wherein operation is from the power source in the second subsystem, and a time-shared mode of operation wherein some or all of the power sources are turned on sequentially.

Figure 6:
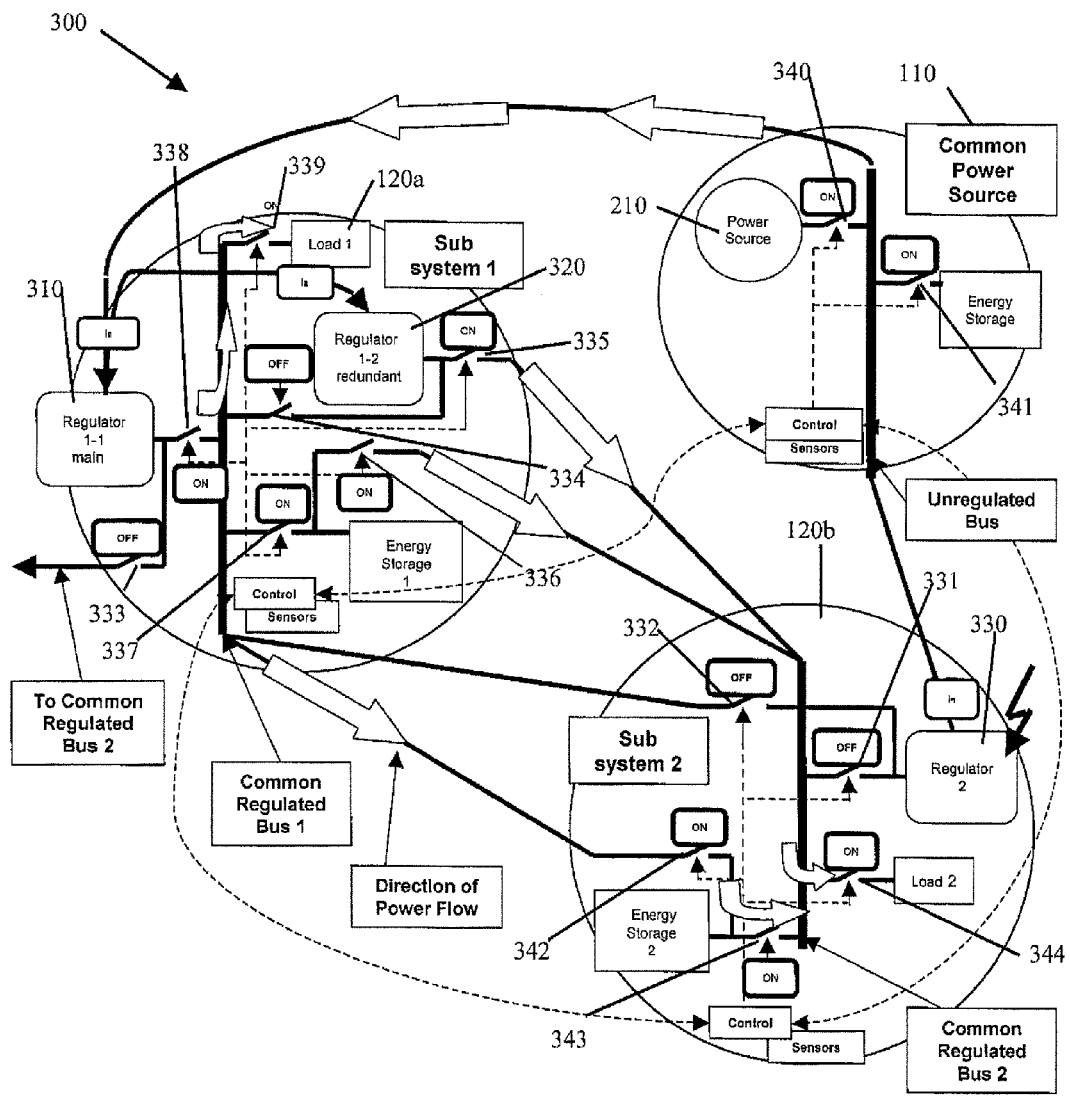
FIG. 6 is a block diagram of a three-regulator embodiment of the present invention.

Referring now to FIG. 6, a power system 300 comprising a common power source 110 feeding two subsystems 120a and 120b is shown. Subsystem 120a includes one main regulator 310 and one redundant regulator 320 with each regulator capable of providing full power for either subsystem 120a or 120b. FIG. 6 illustrates one mode of operation when regulator 330 of subsystem 120b has failed and regulator 320 in subsystem 120a continuously provides power to the subsystem 120b.

Switches 340 and 341 of common power source 110 are closed, switches 333 and 334 of subsystem 120a are open while switches 335 through 339 of subsystem 120a are closed. In subsystem 120b, switches 331 and 332 are open while switches 342, 443 and 334 are closed. With this arrangement power from power source 210 of common power source 110 is provided to regulator 310 and regulator 320 of subsystem 120a. The regulators then provide regulated power to the load 121 a of subsystem 120a and to the load 121b of subsystem 120b.

This example demonstrates the ability of the present power system architecture to reduce the total number of regulators to three and maintain redundancy for both subsystems. A conventional solution calls for connecting buses 1 and 2 in parallel, but if the voltage V1 (bus 1) is different from the voltage 2 (bus 2) this approach will not be feasible. In this case, the buses have to be separate and redundant operation of subsystem 2 will require an additional regulator (four total).

Figure 7A:
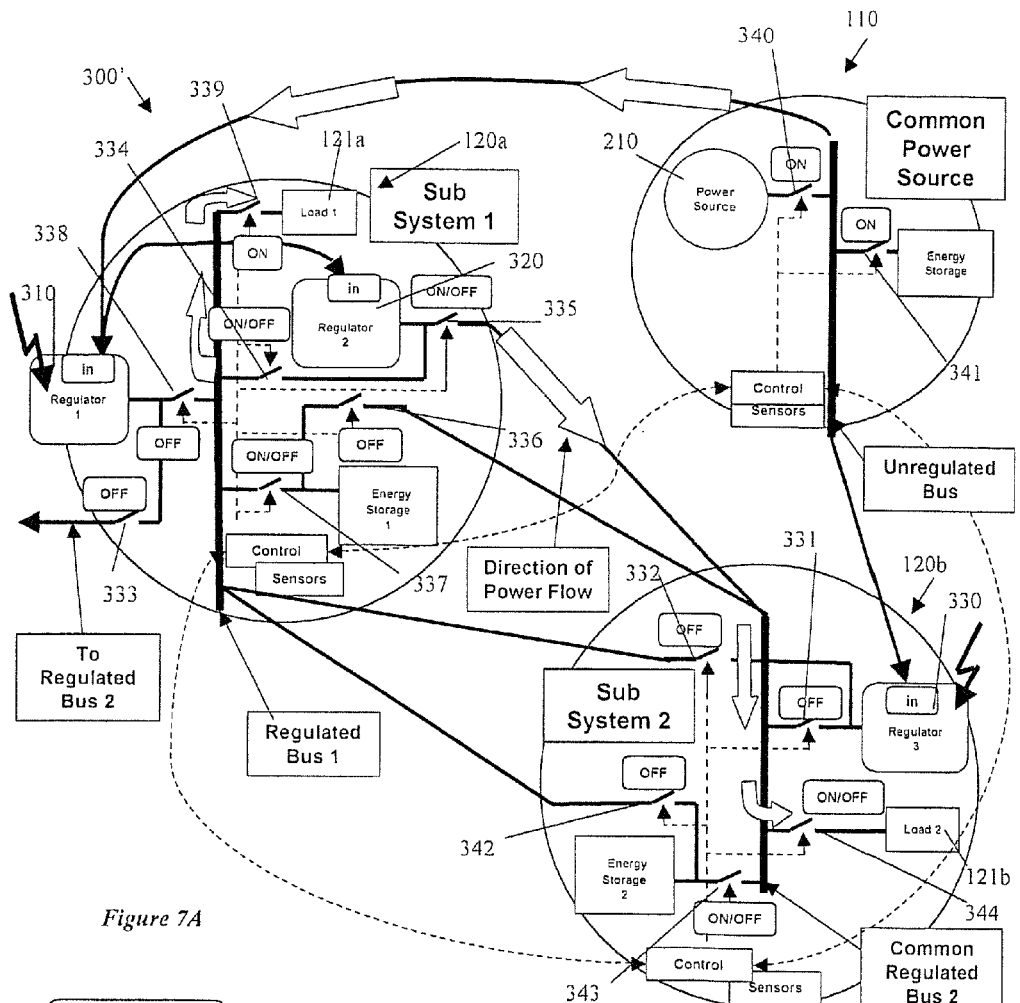
FIG. 7A is a block diagram of a time-shared embodiment of the present architecture.

FIG. 7A shows the same system as FIG. 6, but operating under a different set of conditions. This system is labeled 300'. In this example, two of the regulators are out of service (regulators 310 and 330 have failed, while regulator 320 remains operational). As shown in FIG. 7A, the power system overcomes these failures by operating on a time-shared basis. As shown in the timing diagram of FIG. 7B, regulator 320 feeds the subsystem 120a for time interval T1 and feeds subsystem 120b for time interval T2. This mode does not have to be periodic and controllers can modify both time intervals as required. Similarly to the previous case, if the input voltage for the two subsystems is different, the subsystem 120a controller can vary the output of regulator 330 to satisfy each subsystem's requirements.

Figure 7B:
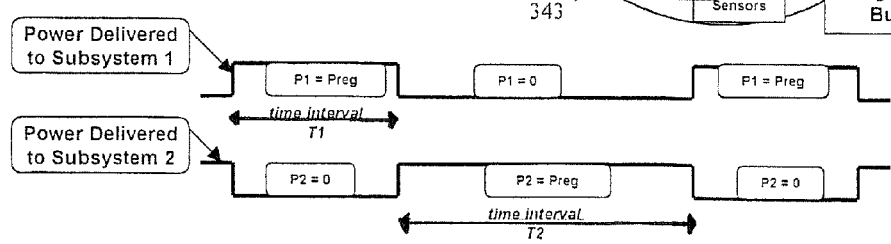
FIG. 7B is a timing diagram of the time-shared embodiment of FIG. 7A.

In the system 300' switches 340 and 341 of the common power source are closed. In subsystem 102a switches 333, 336 and 338 are opened, switch 339 is closed and switches 334, 335 and 337 are cycled between the open and closed positions. In subsystem 120b, switches 331, 332 and 342 are opened while switches 343 and 344 are cycled. As shown in FIG. 7B, power is delivered to subsystem 120a for a predetermined period of time, then to subsystem 120b for a predetermined period of time, and there is no overlap between the power delivery to the two subsystems. Switches 337 and 344 are closed and switches 334, 335 and 343 are opened to provide power to load 121a of subsystem 120a. Switches 337 and 344 are opened and switches 334, 335 and 343 are closed to provide power to load 121b of subsystem 120b. These switches 334, 335, 337, 343 and 344 are cycled in order to provide power on a time-shared basis to subsystem 120a and subsystem 120b.

Figure 8:
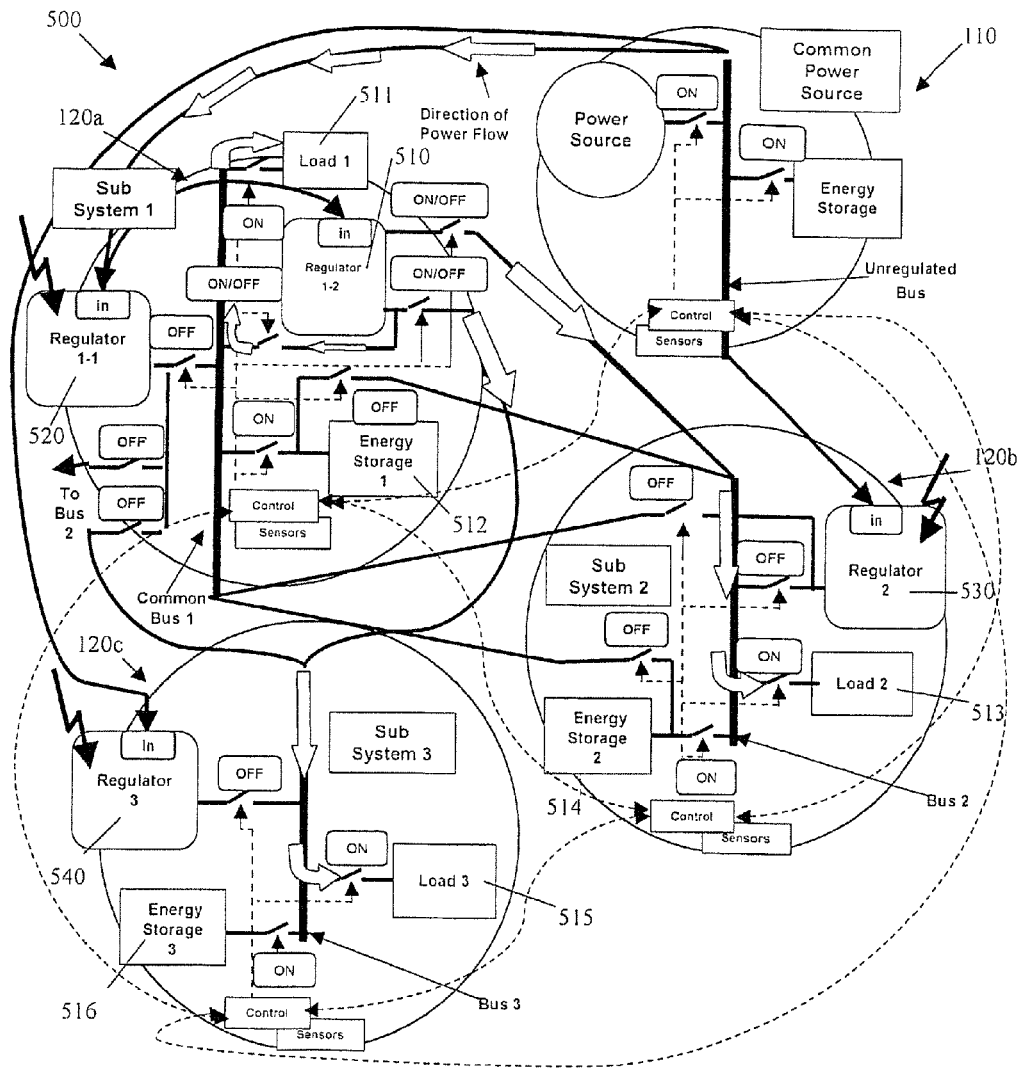
FIG. 8 is a block diagram showing an arrangement wherein three subsystems are operating from a single regulator in the time-shared mode.
Figure 9:
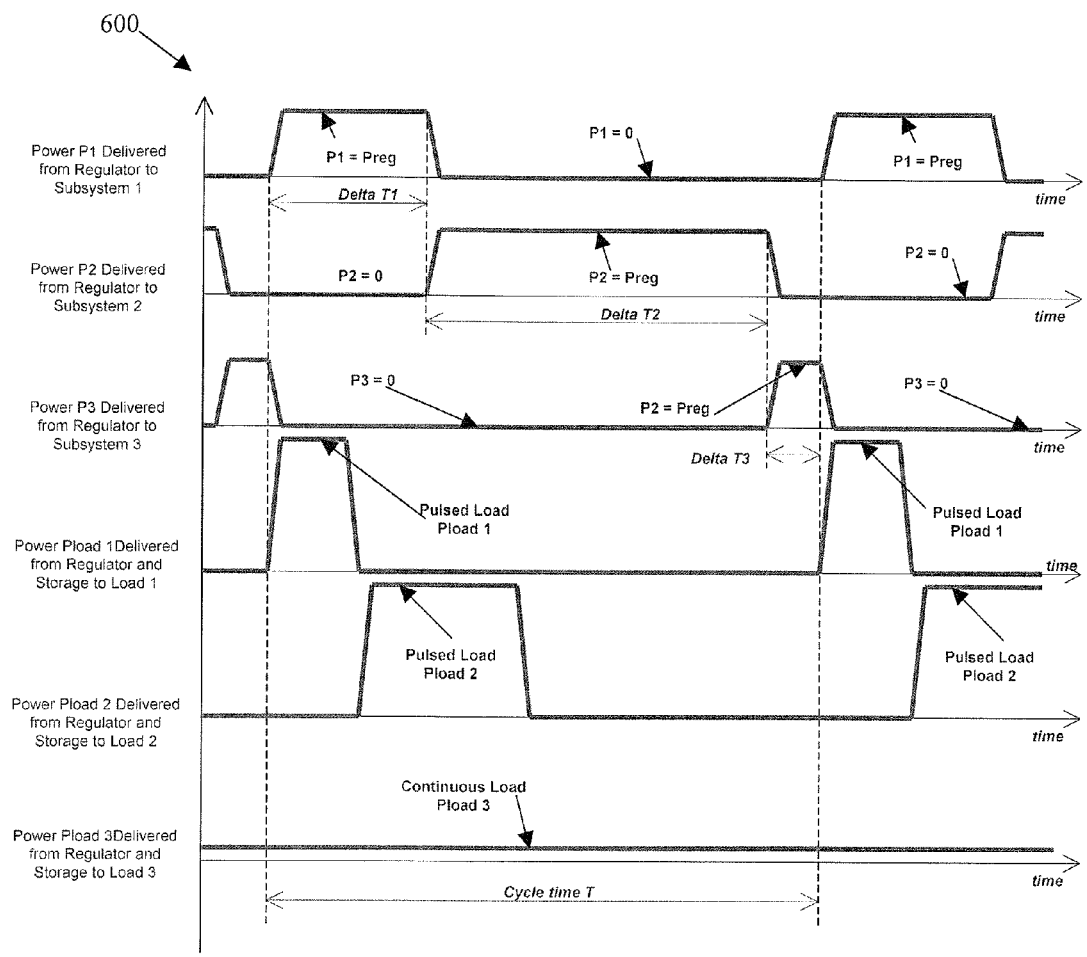
FIG. 9 is a timing diagram showing the time-shared mode of operation.
Figure 10:
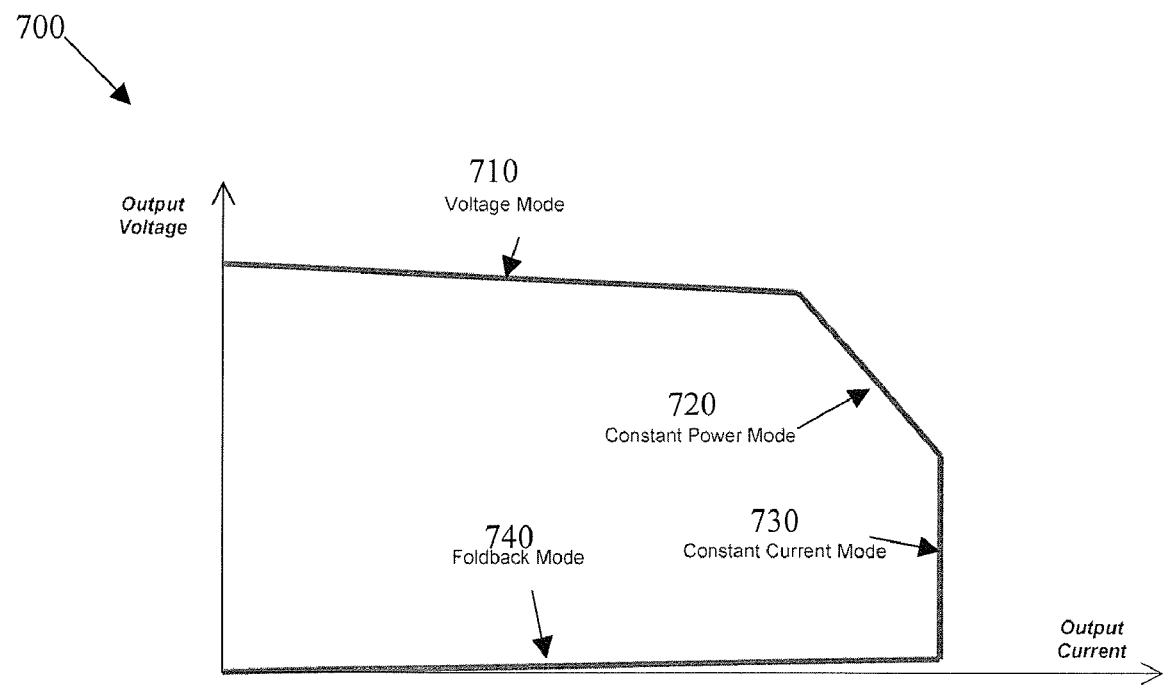
FIG. 10 is a graph showing output voltage versus output current for a regulator of the present power system.

FIGS. 8 through 10 illustrate a method of using energy storage devices to feed pulsed loads. FIG. 8 shows a configuration 500 including three subsystems 120a, 120b and 120c that operate from a single regulator 510 while three other regulators 520, 530, and 540 are out of service. Also, as shown in graph 600 of FIG. 9, loads for subsystems 120a and 120b draw pulsed power that exceeds the rated power of the regulator 510. Even under these demanding conditions, the present power system architecture provides power on a time-shared basis to all loads if the following conditions are met:

Time intervals when one regulator is connected to a given subsystem do not overlap, $$T \geq \Sigma T_a \text{ for the summation from } a=1 \text{ to } a=3$$

Where $T_a$ is the time interval when a subsystem is connected to the regulator and T is the repeatable time interval.

The average power $P_{reg}$ delivered by the regulator does not exceed the total average power consumed by all loads or, for a lossless system:

$$P_{reg} \geq (1/T) * \int (\Sigma(P_a(t))dt$$

for the interval of integration from t=0 to t=T and the summation from a=1 to a=3

Where $P_a(t)$ is the load power for a given subsystem load, a is the load number.

The system 500 operates as follows. Because load 511 of subsystem 120a requires more power than regulator 510 can deliver, the energy storage 512 provides the rest of the power. When the load 511 is turned off, the regulator 510 recharges the energy storage 512 during the remainder of the time interval T1.

When load 513 of subsystem 120b is turned on, the regulator is still connected to the subsystem 120a. Consequently, the energy storage unit 514 is feeding the subsystem 120b until the beginning of time interval T2. At this time, regulator 510 of subsystem 120a starts delivering power to load 513 and recharging the energy storage 514 of the subsystem 120b.

Subsystem 120c operates in a similar way. The only difference is that subsystem 120c has a constant load thereby its power demand never exceeds the rated power of the regulator 510. During time intervals T1 and T2 the energy storage unit 516 of subsystem 120c provides power to load 515. When regulator 510 is connected to subsystem 120c, it starts recharging the energy storage unit 516 and feeding load 515.

Similar to the previous described configurations, the pulsed load mode does not have to be periodic and controllers can modify all time intervals as needed as long as the conditions listed above are satisfied. Also, if the input voltage needed by subsystems is different, the subsystem controller can vary the output of the regulator to satisfy each system's requirements.

Referring now to FIG. 10, a graph 700 showing the different modes of operation of the regulator is shown. The graph 700 shows a first mode of operation referred to as the voltage mode 710. As can be seen in the voltage mode of operation the voltage is nearly constant regardless of the output current. Output voltage versus current (VA) characteristic of the regulators also has constant power mode 720. In this mode the voltage varies directly opposite the current resulting in constant power over a range of voltages and currents. Additionally, the regulators have a constant current mode 730. In this mode the regulator provides a constant current value over a range of voltages. A foldback mode 740 is also shown. In foldback mode the regulator decrease the output current with increasing overload, reaching a minimum at short circuit. This minimizes internal power dissipation under overload conditions.

Figure 11A:
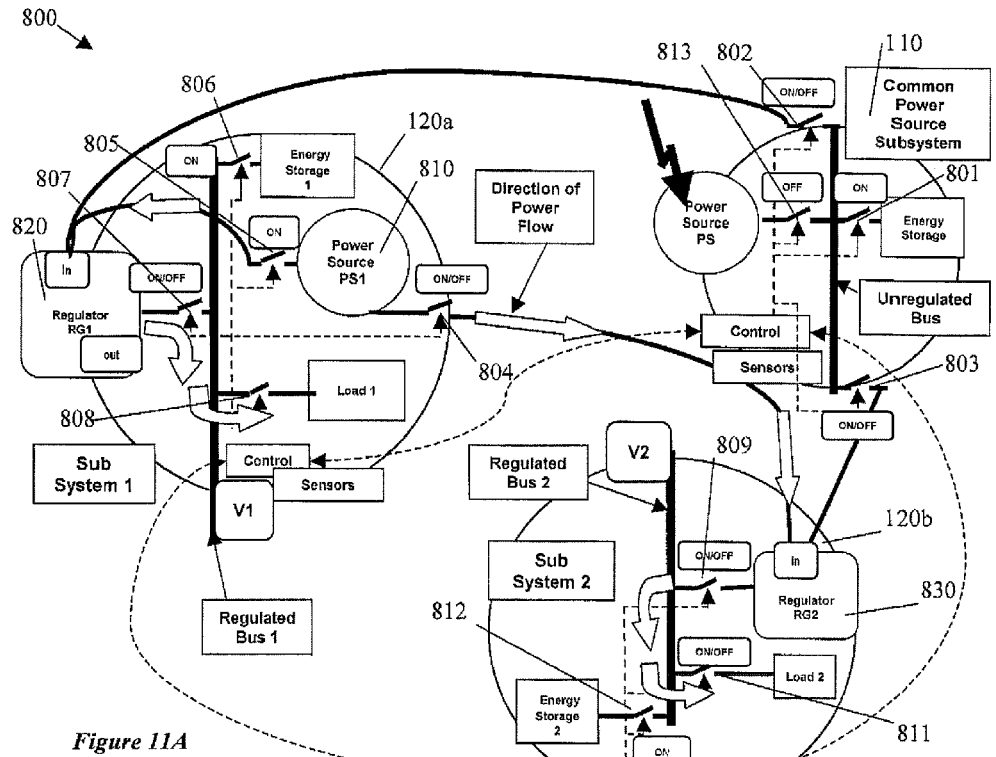
FIG. 11A is a block diagram showing an arrangement wherein two subsystems are operating from a single power source.

Referring now to FIG. 11A, a system 800 is shown in a configuration wherein two subsystems 120a and 120b operate from a common power source. An additional unregulated power source 810 is incorporated in the subsystem 120a. If the rated power of unregulated power source 810 is sufficient to feed only one subsystem, time-sharing will allow operating both subsystems 120a and 120b in the event of a failure of the common power source.

Switch 801 of common power source 110 is closed, switch 813 is open and switches 802 and 803 are cycled. In subsystem 120a switches 805, 806 and 808 are closed while switches 807 and 804 are cycled. In subsystem 120b, switch 812 is closed while switches 809 and 811 are cycled. With this arrangement power from power source 810 of subsystem 120a is provided to regulator 820 at one time interval through switch 807. Further, power is delivered from power source 810 of subsystem 120a to regulator 830 of subsystem 120b via switch 804 during a second time interval.

Figure 11B:
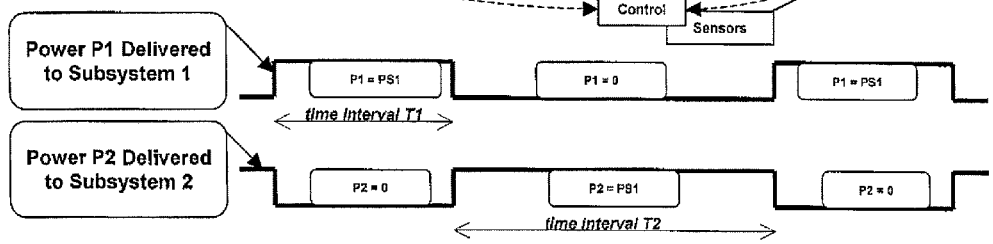
FIG. 11B is a timing diagram showing power delivery for the arrangement of FIG. 11A.

As shown in FIG. 11B, during time interval T1 the power source 810 delivers power to the subsystem 120a through the regulator 820 while the regulator 830 is disconnected from the system. As the time interval T2 begins, the regulator 820 is turned off and power starts flowing from power system 810 to the subsystem 120b through the regulator 830. This example shows a case when either load does not exceed the rated power of the source. If this condition is not satisfied, energy sources can be used to average peak power demands of the loads as described above with respect to FIGS. 8-10.

Figure 12A:
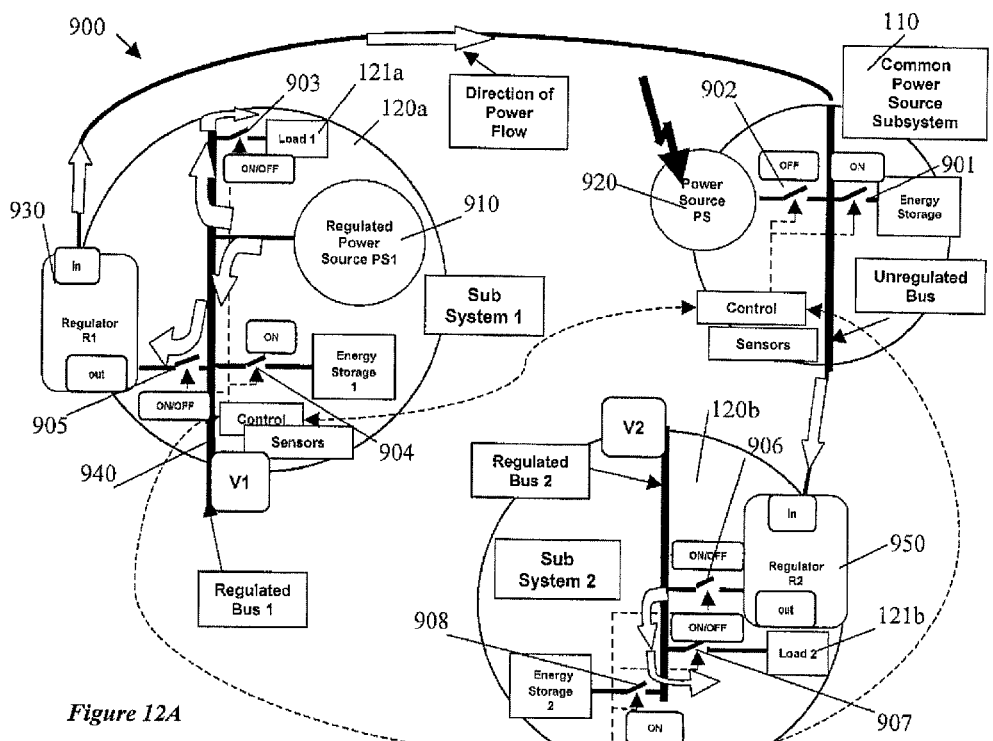
FIG. 12A is a block diagram showing another arrangement wherein two subsystems are operating from a single power source.

FIG. 12A shows a system 900 in a configuration wherein two subsystems 120a and 120b are fed by a common power source 110. Unlike the system shown in FIG. 11A, the power source 910 in this system generates regulated voltage and does not have a connection to the second subsystem 120b. Again, if the common source 920 fails, the power source 910 can feed both subsystems 120a and 120b on a time-shared basis.

Switch 901 of common power source 110 is closed, and switch 902 is open. Switch 904 of subsystem 120a is closed while switches 903 and 905 are cycled. In subsystem 120b, switch 908 is closed and switches 906 and 907 are cycled. With this arrangement power from power source 910 of subsystem 120a is provided to the load of subsystem 120a through switch 903 during a first time interval and power is delivered to subsystem 120b through switch 905 during a second time interval.

Figure 12B:
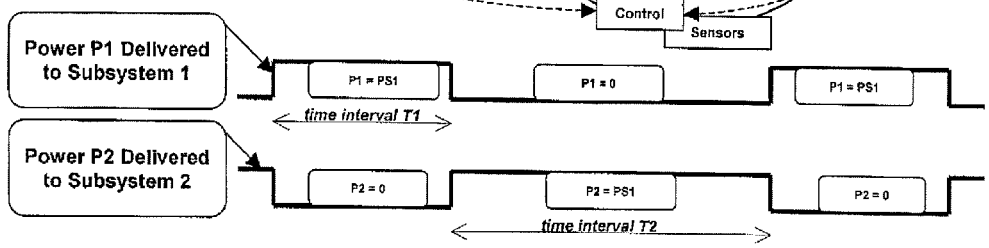
FIG. 12B is a timing diagram showing power delivery for the arrangement of FIG. 12A.

As shown in FIG. 12B, during the time interval T1, power source 910 delivers power directly to the subsystem 120a bypassing the regulator 930 that is disconnected via switch 905 from the regulated bus 940 of subsystem 120a. During the time interval T2, the regulator 930 is connected to regulated bus 940 via switch 905 and converts its voltage V1 to the input voltage for the regulator 950 that feeds the second subsystem 120b. This mode of operation is particularly useful when one common source powers several subsystems that have different regulated bus voltages. To enable this mode of operation, the regulator 930 is bi-directional i.e. it is able to send power from the input to the output and vice versa. If either subsystem needs pulsed power, energy sources can be used to average peak power loads as described above.

Figure 13A:
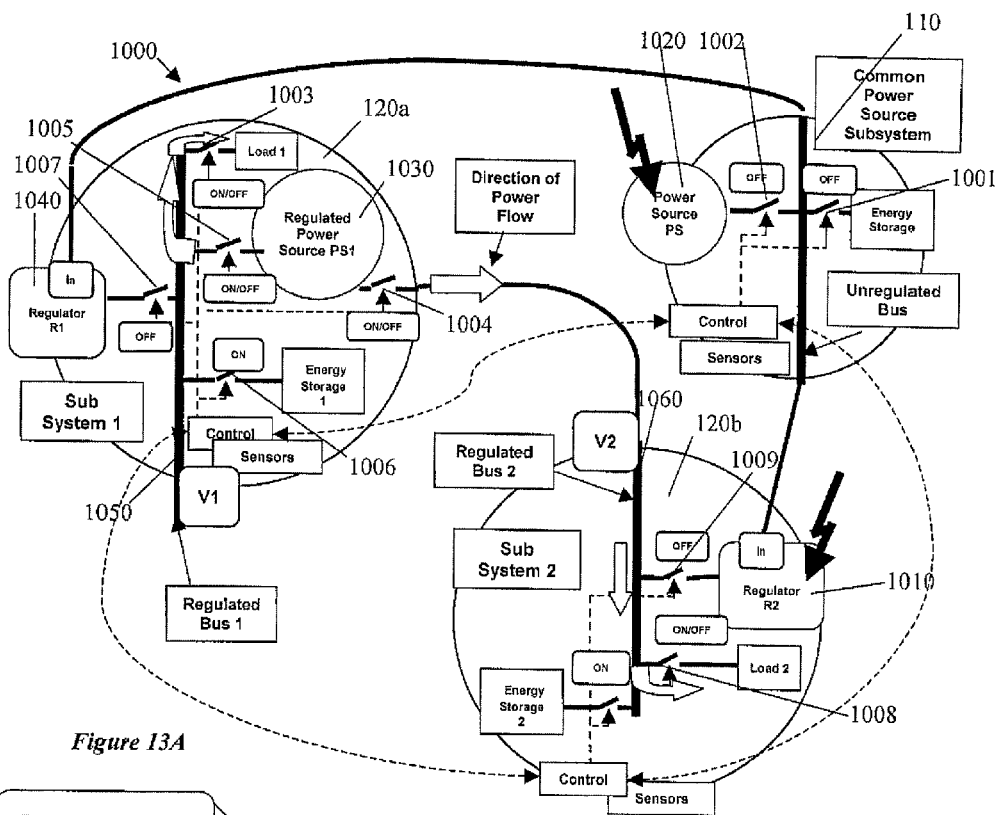
FIG. 13A is a block diagram showing an arrangement having multiple faults.

Referring now to FIG. 13A, an embodiment 1000 which demonstrates how the new architecture improves reliability and maintains operation in the presence of multiple faults is presented. In this example, a second failure disabled the regulator 1010, so neither power source 1020 nor regulator 1010 are in service. Under these conditions, the regulated power source 1030 feeds both subsystems 120a and 120b on a time-shared basis while the regulator 1040 is turned off via switch 1007.

Switches 1001 and 1002 of common power source 110 are open. Switch 1006 of subsystem 120a is closed, switch 1007 is open and switches 1003-1005 are cycled. In subsystem 120b, switch 1009 is open and switch 1008 is cycled. With this arrangement power from power source 1030 of subsystem 120a is provided to the load 121a of subsystem 120a via switches 1003 and 1005 during a first time interval and power is delivered to subsystem 120b via switch 1004 during a second time interval.

Figure 13B:
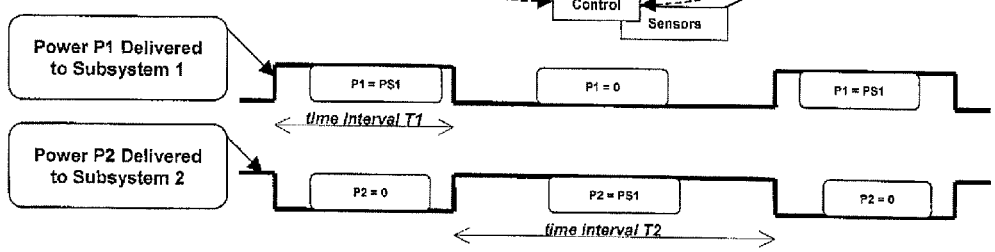
FIG. 13B is a timing diagram showing power delivery for the arrangement of FIG. 13A.

As shown in FIG. 13B, during the time interval T1, the power source 1030 delivers power to the subsystem 120a. During the time interval T2, power source 1030 is switched from bus 1050 with voltage V1 to the bus 1060 with voltage V2. To enable this mode of operation, the source's output has to be programmable and its range shall include voltage V2. This example shows a case when either load does not exceed the rated power of the power source 1030. If this condition is not met, energy sources can be used to average peak power loads as described above with respect to FIGS. 8-10.

An intelligent power system has been described. The power system includes one or more common power sources and one or more subsystem components interconnected with the common power sources. With such a configuration, the system is able detect and isolate failed segments of the power system and is reconfigurable to restore power.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

What is claimed is:

1. A power system common power source subsystem comprising:
   a power source unregulated bus;
   a plurality of power source regulated buses, each respective power source regulated bus originating at a common power source and terminating at a respective one of k load subsystems, each respective power source regulated bus directly coupling only the common power source and the respective one of the k load subsystems;
   for each respective one of the k load subsystems, a plurality of direct independent electrical interconnections between the respective one of the k load subsystems and each other one of the k load subsystems, each direct independent electrical interconnection comprising one or more conductors, wherein each direct independent electrical interconnection originates at the respective one of the k load subsystems and terminates at one other of the k load subsystems without coupling to any other of the k load subsystems, such that there is no more than a single direct independent electrical interconnection between any two of the k load subsystems;
   at least one power source, each of the at least one power source having an output;
   a first group of at least one switch, each of the first group of at least one switch coupling a respective one of the at least one power source output to the power source unregulated bus;
   at least one regulator, each of the at least one regulator having an input and a plurality of outputs;
   at least one energy storage element, each of the at least one energy storage element having an output coupled to a respective one of the at least one regulator and being further constructed and arranged so as to be able to be recharged by the at least one regulator;
   a second group of at least one switch, each of the second group of at least one switch coupling a respective input of the at least one regulator to the power source unregulated bus; and
   a third group of at least one switch, each of the third group of at least one switch coupling a respective one of the at least one regulator's outputs to the power source regulated bus; and
   a fourth group of at least one switch, each of the fourth group of at least one switch coupling a respective output of the at least one energy storage element to the subsystem regulated bus and wherein the fourth group of at least one switch is controlled by the regulator;
   wherein at least one of the plurality of outputs of the regulator is coupled to at least one of the first group of at least one switch, at least one of the plurality of outputs of the regulator is coupled to at least one of the second group of at least one switch, at least one of the plurality of outputs of the regulator is coupled to at least one of the third group of at least one switch, and at least one of the plurality of outputs of the regulator is coupled to at least one of the fourth group of at least one switch;
   wherein the regulator is configured to provide a time-shared mode of operation to provide power sequentially to one or more of the k load subsystems, wherein:
   a time interval T defines a repeatable time interval of the regulator;
   a time interval $T_a$ defines a time interval when a respective one of the k load subsystems, load a, is connected to the regulator;
   the regulator is configured to operably couple a given one of the k load subsystems, load a, to the regulator during the respective time interval $T_a$, such that the time intervals when the regulator is connected to any one the respective one of the k load subsystems do not overlap, whereby $T \geq \Sigma T_a$ for the summation from a=1 to a=k;
   the regulator is configured to switch in supplemental power from the energy storage element during $T_a$, if necessary, to ensure that an average power $P_{reg}$ delivered by the regulator does not exceed the average power consumed by all of the k load subsystems, such that:

$$P_{reg} \geq (1/T) * \int (\Sigma(P_a(t))dt$$

for the interval of integration from t=0 to t=T and the summation from a=1 to a=k
   where $P_a(t)$ is the load power for a given one of the k load subsystems and where a is the load number.

2. The power system common power source subsystem of claim 1, wherein:
   at least one of the k load subsystems, load a, is a pulsed load subsystem, such that, for load a, $T_a = T_{a,on} + T_{a,off}$, where time period $T_{a,on}$ is a time period during which the load a is on and $T_{a,off}$ is a time period during which the load is off, wherein the load a requires power from the regulator only during time period $T_{a,on}$.

3. The power system common power source subsystem of claim 2, wherein the pulsed mode of the pulsed load subsystem is periodic.

4. The power system common power source subsystem of claim 2, wherein the pulsed mode of the pulsed load system is not periodic.

5. The power system common power source subsystem of claim 2, wherein the regulator is configured to control the third group of at least one switch and the fourth group of at least one switch so as to enable the regulator to recharge the energy storage element during $T_{a,off}$.

6. The power system common power source subsystem of claim 1, wherein the regulator is configured to adjust at least one of T for the regulator and $T_a$ for any one or more of the k load subsystems so as to ensure that $T \geq \Sigma T_a$ for the summation from a=1 to a=k.

7. The power system common power source subsystem of claim 2, wherein the regulator is configured to adjust at least one of T, $T_{a,on}$ and $T_{a,off}$ for any one or more of the k load subsystems so as to ensure that $T \geq \Sigma T_a$ for the summation from a=1 to a=k.

8. The power system common power source subsystem of claim 1, wherein the regulator is configured to adjust at least one of T for the regulator and $T_a$ for any one or more of the k load subsystems so as to ensure that $$P_{reg} \geq (1/T) * \int (\Sigma(P_a(t))dt$$

for the interval of integration from t=0 to t=T and the summation from a=1 to a=k.

9. The power system common power source subsystem of claim 1 wherein each one of the respective k load subsystems has associated with it a respective, separate energy storage element.

10. The power system common power source subsystem of claim 1, further comprising a plurality of energy storage elements, such that at least a first portion of the k load subsystems have associated with them respective energy storage elements, and at least a second portion of the k load subsystems do not have associated with them respective energy storage elements, wherein at least one of the plurality of energy storage elements associated with a respective one of the k load subsystems in the first portion comprises a distributed energy storage element that is able to share its energy with at least one of the k load subsystems in the second portion of k load subsystems.

11. The power system common power source subsystem of claim 10, wherein the distributed energy storage element shares energy with the at least one of the k load subsystems in the second portion of k load subsystems that is physically closest to the respective one of the k load subsystems in the first portion.

12. The power system common power source subsystem of claim 1, wherein the energy storage element is constructed and arranged so as to be continuously recharged by the regulator.

13. The power system common power source subsystem of claim 11, wherein the energy storage element is constructed and arranged so as to be continuously recharged by the regulator if the energy storage element is depleted.

14. The power system common power source subsystem of claim 1, wherein the energy storage element is constructed and arranged so as to be recharged during a time interval when the regulator does not require energy storage.

15. The power system common power source subsystem of claim 1, wherein, when the regulator is recharging the energy storage element, the power delivered to a given one or more of the k load subsystems is reduced by approximately the same amount of power as is delivered to the energy storage element.

16. A method of operating a power system common power source subsystem, the method comprising:
providing a power source unregulated bus;
providing a plurality of power source regulated buses, each respective power source regulated bus originating at a common power source and terminating at a respective one of k load subsystems, each respective power source regulated bus directly coupling only the common power source and the respective one of the k load subsystems;
for each respective one of the k load subsystems, providing a plurality of direct independent electrical interconnections between the respective one of the k load subsystems and each other one of the k load subsystems, each direct independent electrical interconnection comprising one or more conductors, wherein each direct independent electrical interconnection originates at the respective one of the k load subsystems and terminates at one other of the k load subsystems without coupling to any other of the k load subsystems, such that there is no more than a single direct independent electrical interconnection between any two of the k load subsystems;
providing at least one power source, each of the at least one power source having an output;
providing a first group of at least one switch, each of the first group of at least one switch coupling a respective one of the at least one power source output to the power source unregulated bus;
providing at least one regulator, each of the at least one regulator having an input and a plurality of outputs;
providing at least one energy storage element, each of the at least one energy storage element having an output coupled to a respective one of the at least one regulator and being further constructed and arranged so as to be able to be recharged by the at least one regulator;
providing a second group of at least one switch, each of the second group of at least one switch coupling a respective input of the at least one regulator to the power source unregulated bus;
providing a third group of at least one switch, each of the third group of at least one switch coupling a respective one of the at least one regulator's outputs to the power source regulated bus;
providing a fourth group of at least one switch, each of the fourth group of at least one switch coupling a respective output of the at least one energy storage element to the subsystem regulated bus and wherein the fourth group of at least one switch is controlled by the regulator;
coupling at least one of the plurality of outputs of the regulator to at least one of the first group of at least one switch, coupling at least one of the plurality of outputs of the regulator to at least one of the second group of at least one switch, coupling at least one of the plurality of outputs of the regulator to at least one of the third group of at least one switch, and coupling at least one of the plurality of outputs of the regulator to at least one of the fourth group of at least one switch;
configuring the regulator is to provide a time-shared mode of operation to provide power sequentially to one or more of the k load subsystems, wherein the configuring further comprises:
defining a repeatable time interval T of the regulator;
defining a time interval $T_a$ that defines a time interval when a respective one of the k load subsystems, load a, is connected to the regulator;
configuring the regulator to operably couple a given one of the k load subsystems, load a, to the regulator during the respective time interval $T_a$, such that the time intervals when the regulator is connected to any one the respective one of the k load subsystems do not overlap, whereby $T \geq \Sigma T_a$ for the summation from a=1 to a=k; and
configuring the regulator to switch in supplemental power from the energy storage element during $T_a$, if necessary, to ensure that an average power $P_{reg}$ delivered by the regulator does not exceed the average power consumed by all of the k load subsystems, such that:

$$P_{reg} \geq (1/T)^* \int (\Sigma(P_a(t))dt$$

for the interval of integration from t=0 to t=T and the summation from a=1 to a=k
where $P_a(t)$ is the load power for a given one of the k load subsystems and where a is the load number.

17. The method of claim 16, further comprising:
configuring at least one of the k load subsystems, load a, to be a pulsed load subsystem, such that, for load a, $T_a = T_{a,on} + T_{a,off}$, where time period $T_{a,on}$ is a time period during which the load a is on and $T_{a,off}$ is a time period during which the load is off, wherein the load a requires power from the regulator only during time period $T_{a,on}$.

18. The method of claim 17, further comprising:
configuring the regulator to adjust at least one of T, $T_{a,on}$ and $T_{a,off}$, for any one or more of the k load subsystems so as to ensure that $T \geq \Sigma T_a$ for the summation from a=1 to a=k.

19. The method of claim 16, further comprising:
providing a plurality of energy storage elements, such that at least a first portion of the k load subsystems have associated with them respective energy storage elements, and at least a second portion of the k load subsystems do not have associated with them respective energy storage elements, wherein at least one of the plurality of energy storage elements associated with a respective one of the k load subsystems in the first portion comprises a distributed energy storage element that is able to share its energy with at least one of the k load subsystems in the second portion of k load subsystems.

20. The method of claim 19, further comprising
configuring the distributed energy storage element so that it can perform at least one action from the following set of actions:
(a) share energy with the at least one of the k load subsystems in the second portion of k load subsystems that is physically closest to the respective one of the k load subsystems in the first portion; and
(b) recharge its energy by being continuously recharged by the regulator if the distributed energy storage element is depleted.

* * * * *